United States Patent [19]

Ikeda et al.

[11] Patent Number: 5,548,342
[45] Date of Patent: Aug. 20, 1996

[54] LUMINANCE/CHROMINANCE SEPARATING CIRCUIT USING PREDETERMINED SEPARATIONS

[75] Inventors: Kazumasa Ikeda; Ken Hirata, both of Tokyo, Japan

[73] Assignee: Kabushiki Kaisha Toshiba, Kanagawa-ken, Japan

[21] Appl. No.: 500,639

[22] Filed: Jul. 11, 1995

Related U.S. Application Data

[63] Continuation of Ser. No. 201,990, Feb. 25, 1994, abandoned.

[30] Foreign Application Priority Data

Feb. 26, 1993 [JP] Japan .................................. 5-037210
Aug. 19, 1993 [JP] Japan .................................. 5-204968

[51] Int. Cl.⁶ ........................................... H04N 9/78
[52] U.S. Cl. ................ 348/668; 348/665; 348/667
[58] Field of Search ............................ 348/665, 659, 348/628, 664, 667, 234, 668; H04N 9/78

[56] References Cited

U.S. PATENT DOCUMENTS

| | | | |
|---|---|---|---|
| 4,803,547 | 2/1989 | Stratton | 358/31 |
| 4,994,906 | 2/1991 | Moriwake | 348/668 |
| 5,173,768 | 12/1992 | Sowig et al. | 348/667 |
| 5,216,495 | 6/1993 | Suwald et al. | 348/665 |
| 5,264,922 | 11/1993 | Senuma | 348/665 |
| 5,335,021 | 8/1994 | Sawada | 348/664 |
| 5,394,193 | 2/1995 | Kim | 348/667 |
| 5,426,470 | 6/1995 | Kita et al. | 348/667 |

FOREIGN PATENT DOCUMENTS

| | | | |
|---|---|---|---|
| A0217649 | 4/1987 | European Pat. Off. | H04N 9/78 |
| 63045988 | 2/1988 | Japan | H04N 9/78 |
| 63088989 | 4/1988 | Japan | H04N 9/78 |
| 63149980 | 6/1988 | Japan | H04N 9/78 |
| 63206088 | 8/1988 | Japan | H04N 9/78 |
| 64-7550 | 2/1989 | Japan | H04N 9/77 |
| 02219393 | 8/1990 | Japan | H04N 9/78 |
| 04351090 | 4/1992 | Japan | H04N 9/78 |
| 04265092 | 9/1992 | Japan | H04N 9/78 |
| 4265092 | 9/1992 | Japan | H04N 9/78 |

*Primary Examiner*—Safet Metjahic
*Assistant Examiner*—Jeffrey S. Murrell
*Attorney, Agent, or Firm*—Finnegan, Henderson, Farabow, Garrett & Dunner, L.L.P.

[57] ABSTRACT

A vertical impulse detecting circuit 104 detects the difference between a level of data of a present horizontal line of an input composite picture signal and a level of data of each of a horizontal line a plurality of lines ahead and a horizontal line a plurality of lines behind. Either an output signal of a three-line chrominance signal separating circuit 100 or an output signal of a horizontal chrominance signal separating circuit 101 is selected as a chrominance signal (CC) that is supplied to a subtracter 105 according to an output signal of the vertical impulse detecting circuit 104.

4 Claims, 12 Drawing Sheets

NTSC  PAL

LINE N-1  LINE N-2
LINE N  N
LINE N+1  N+2

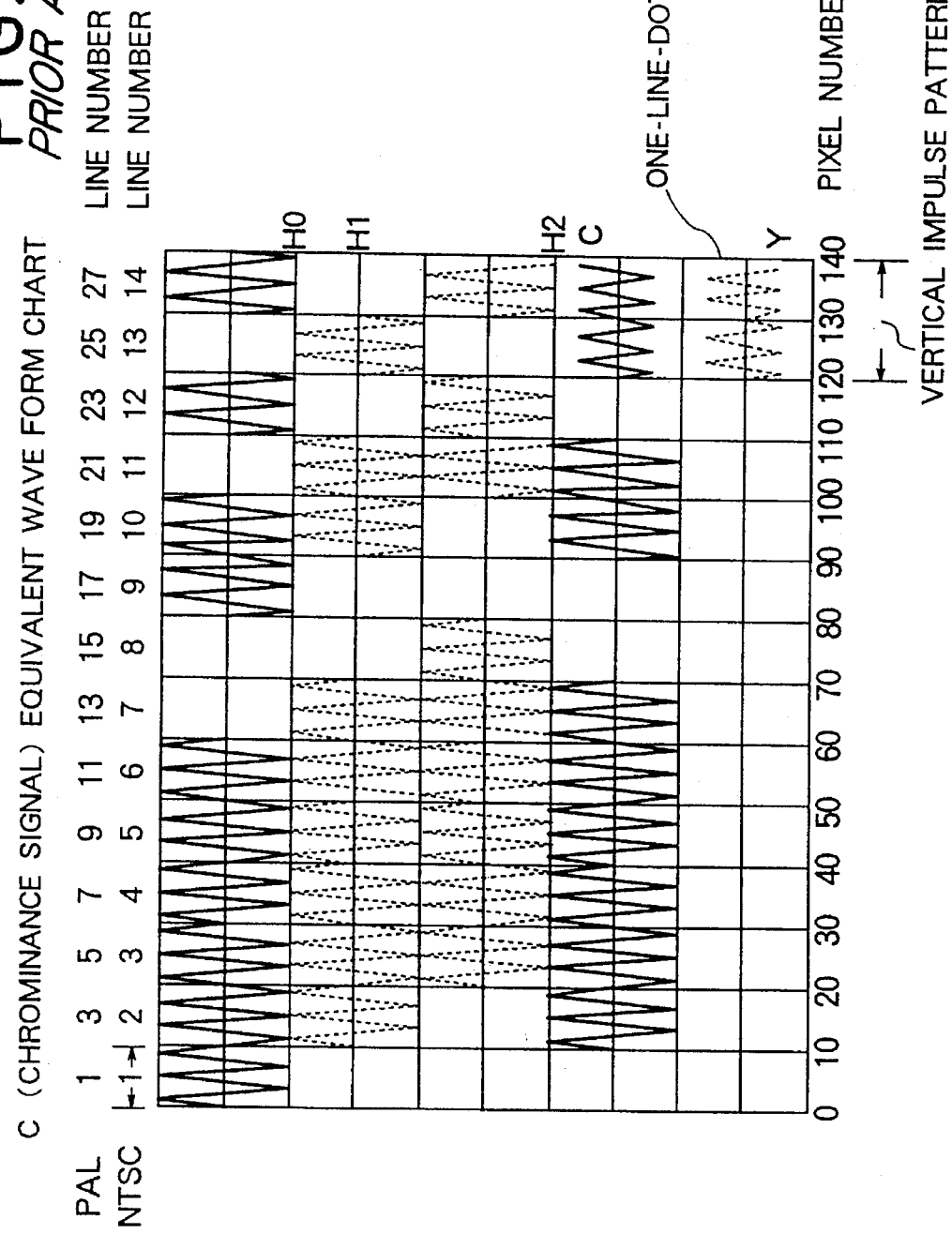

LUMINANCE/CHROMINANCE SEPARATING CIRCUIT USING PREDETERMINED SEPARATIONS

This application is a continuation, of application Ser. No. 08/201,990, filed Feb. 25, 1994, now abandoned.

BACKGROUND OF THE INVENTION

1. Field of the Invention

The present invention relates to a Y/C separating circuit suitably for use with NTSC system and PAL system and for precisely separating a luminance signal and a chrominance signal from an input composite picture signal with small data correlation between horizontal lines of the input composite picture signal.

2. Description of the Related Art

FIG. 9 is a block diagram showing a construction of a conventional separating circuit that is used with the NTSC system and separates a luminance signal and a chrominance signal from an input composite picture signal. Referring to FIG. 9, the input composite picture signal is supplied to a band-pass filter BPF 52 and a one-horizontal-period (1H) delaying circuit 50. An output signal of the delaying circuit 50 is supplied to a band-pass filter BPF 53 and a one-horizontal-period (1H) delaying circuit 51. An output signal of the delaying circuit 51 is supplied to a band-pass filter BPF 54.

The band-pass filters BPF 52, 53, and 54 extract chrominance signal components of these horizontal lines. These output signals that are output from the band-pass filters BPF 52, 53, and 54 are referred to as H0, H1, and H2, respectively. The signal H1 (=b) is referred to as present data. To match a chrominance subcarrier phase of the signal H1 with a chrominance subcarrier phase of each of the signals H0 and H2, the phases of H0 and H2 are inverted by inverters 58 and 59 and output as signals a and c, respectively. Adders 56 and 57 extract signals d and e, where d=(a+b)/2 and e=(b+c)/2. The signals a, b, c, d, and e are supplied to a five-tap median filter 60 that selects a signal with third largest signal level and outputs it as a chrominance signal (C). A subtractor 15 subtracts the chrominance signal (C), which is output from the median filter 60, from an output signal of the 1H delaying circuit 50 and outputs a luminance signal (Y). However, when the correlation of data between horizontal lines of an input composite picture signal is small, the median filter 60 may not extract a required chrominance signal. In this case, a dot interference takes place in the luminance signal (Y), which has been generated by subtracting the output of the median filter 60 from the output of the delaying circuit 50.

The construction of a Y/C separating circuit for use with the PAL system is the same as that for use with the NTSC system except that delaying circuits 50 and 51 delay respective input signals by 2H instead of 1H. As with the Y/C separating circuit for use with the NTSC system, when the correlation of data between horizontal lines of an input composite picture signal is small, a dot interference takes place in a luminance signal (Y), which has been generated by subtracting the output of the median filter 60 from the output of the delaying circuit 50.

Next, with reference to FIGS. 10A and 10B, the dot interference will be described.

FIG. 10A shows a pattern where a red chrominance horizontal line is present at the center of a white screen. This pattern is photographed by a camera or the like and extracted as a composite picture signal. Thereafter, a luminance signal and a chrominance signal are separated from the composite picture signal by the Y/C separating circuit as shown in FIG. 9. When the resultant signals are displayed on a screen of a television receiver, a pattern as shown in FIG. 10B appears. This is because chrominance signal components remain in the luminance signal separated by the Y/C separating circuit shown in FIG. 9 and the chrominance signal components are displayed in a dot shape on the screen of the television receiver. In other words, such a conventional Y/C separating circuit cannot satisfactorily separate a luminance signal and a chrominance signal from an input composite picture signal.

Next, with reference to FIGS. 11 and 12, the dot-interference that takes place in the conventional Y/C separating circuit will be described in more detail.

FIGS. 11 and 12 schematically show a chrominance signal equivalent wave form chart and a luminance signal equivalent wave form chart for the NTSC system (14 lines of picture signal) and the PAL system (27 lines of picture signal). A horizontal scale of 10 of each chart represents one horizontal line period. In FIG. 11, sine waves with (n+½) λ (where λ=wavelength; n=any integer) are present in one horizontal line period. In this chart, a chrominance signal is simply illustrated. In FIG. 12, sine waves with nλ are present in a horizontal scale of 10 (one horizontal line period). In this chart, as with FIG. 11, a luminance signal is simply illustrated. In these charts, H0, H1, and H2 represent output signals of band-pass filters 52, 53, and 54, respectively. When it is assumed that the signal H1 is a present signal, the signals H2 and H0 are a past signal and a future signal, respectively. In FIG. 11, in line 13 where only the signal H1 is a chrominance signal and in line 14 where only the signal H1 is not a chrominance signal, the output signal of the median filter 60 differs from the present signal H1. Thus, a dot interference (one-line-dot interference) takes place in the luminance signal (Y), which has been generated by subtracting the output signal of the median filter 60 from the input composite picture signal.

As described above, regardless of the NTSC system and the PAL system, when the correlation between the present horizontal data of the input composite picture signal and each of the past horizontal data and the future horizontal data (spaced apart therefrom by one horizontal period in the case of the NTSC system and by two horizontal periods in the case of the PAL system) is small, a line-dot interference takes place in the luminance signal separated from the input composite picture signal, thereby deteriorating the picture quality of the television receiver.

SUMMARY OF THE INVENTION

An object of the present invention is to provide a Y/C separating circuit for use with the PAL system and the NTSC system and for preventing a one-line dot interference from taking place.

The present invention is a Y/C separating circuit for separating a luminance signal and a chrominance signal from an input composite picture signal, comprising a three-line chrominance signal separating circuit for receiving the input composite picture signal and separating a chrominance signal from data of three horizontal lines of past, present, and future of the input composite picture signal, a horizontal chrominance signal separating circuit for receiving the input composite picture signal and separating a high band component as a chrominance signal from the input composite image signal, a vertical impulse detecting circuit for receiving the input composite picture signal and determining whether a signal level of the data of the present horizontal line is larger or smaller than each of signal levels of the data of the past horizontal line and the data of the future horizontal line, the present horizontal line being spaced apart from each of the past horizontal lines and the future horizontal line by at least one horizontal line, a selector for selecting either an output signal of the three-line chrominance signal separating circuit or an output signal of the horizontal chrominance signal separating circuit corresponding to an output signal of the vertical impulse detecting circuit, a delaying circuit for delaying the input composite picture signal by a predetermined time period, and a subtracter for subtracting an output signal of the selector from an output signal of the delaying circuit, wherein an output signal of the subtracter becomes a luminance signal.

The vertical impulse detecting circuit determines whether a signal level of a particular horizontal line of the input composite picture signal is larger or smaller than a signal level of each of two horizontal lines preceded and followed by the particular horizontal line. In reality, the detecting circuit calculates the difference between the level of the present horizontal line data and the level of the past horizontal line data followed thereby for predetermined horizontal periods and the difference between the level of the present horizontal line data and the level of future horizontal line data preceded thereby for the predetermined horizontal periods. When each of these differences is larger than a predetermined value and the signs thereof are the same, the detecting circuit determines that a dot interference takes place. When such a dot interference is detected, a chrominance signal of the horizontal chrominance signal separating circuit is selected instead of a chrominance signal of the three-line chrominance signal separating circuit. The selected chrominance signal is subtracted from the input composite picture signal. Thus, a luminance signal that is free of the dot interference can be output.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 11 is a graph showing a function of the conventional Y/C separating circuit.

DESCRIPTION OF THE PREFERRED EMBODIMENTS

Next, with reference to the accompanying drawings, embodiments of the present invention will be described.

Figure 1:
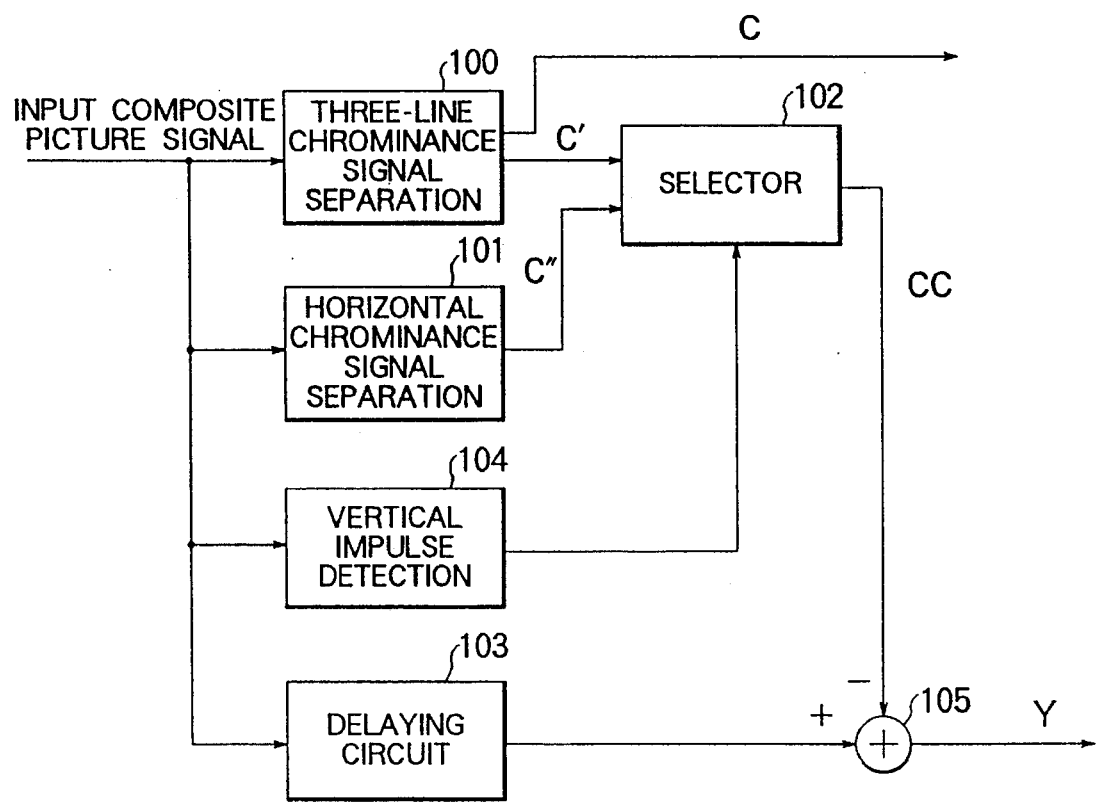
FIG. 1 is a block diagram showing a first embodiment of the present invention.

FIG. 1 shows an embodiment of the present invention. In FIG. 1, a three-line-chrominance signal separating circuit 100 inputs a composite picture signal, separates a chrominance signal (C') from the input composite picture signal, and outputs the chrominance signal (C'). A horizontal chrominance signal separating circuit 101 inputs the composite picture signal, separates a horizontal high band component as a chrominance signal (C") from the input composite picture signal, and outputs the chrominance signal (C"). A selector 102 selects the output signal (C') of the three-line-chrominance signal separating circuit 100 or the output signal (C") of the horizontal chrominance signal separating circuit 101 corresponding to an output signal of a vertical impulse detecting circuit 104 that will be described later and outputs a chrominance signal (CC). The selected chrominance signal (CC) is supplied to one input terminal of a subtracter 105. A delaying circuit 103 inputs the composite picture signal, delays the signal for a predetermined time period, and outputs the delayed signal to another terminal of the subtracter 105. The subtracter 105 generates a luminance signal (Y). A chrominance signal output may be a chrominance signal output of the three-line-chrominance signal separating circuit 100. The chrominance signal (C) may be the same signal as the chrominance signal (C'). The vertical impulse detecting circuit 104 detects a vertical signal pattern of the input composite picture signal with present horizontal line data and two horizontal line data preceded and followed hereby. A practical construction of the vertical impulse detecting circuit 104 will be described later.

Figure 2:
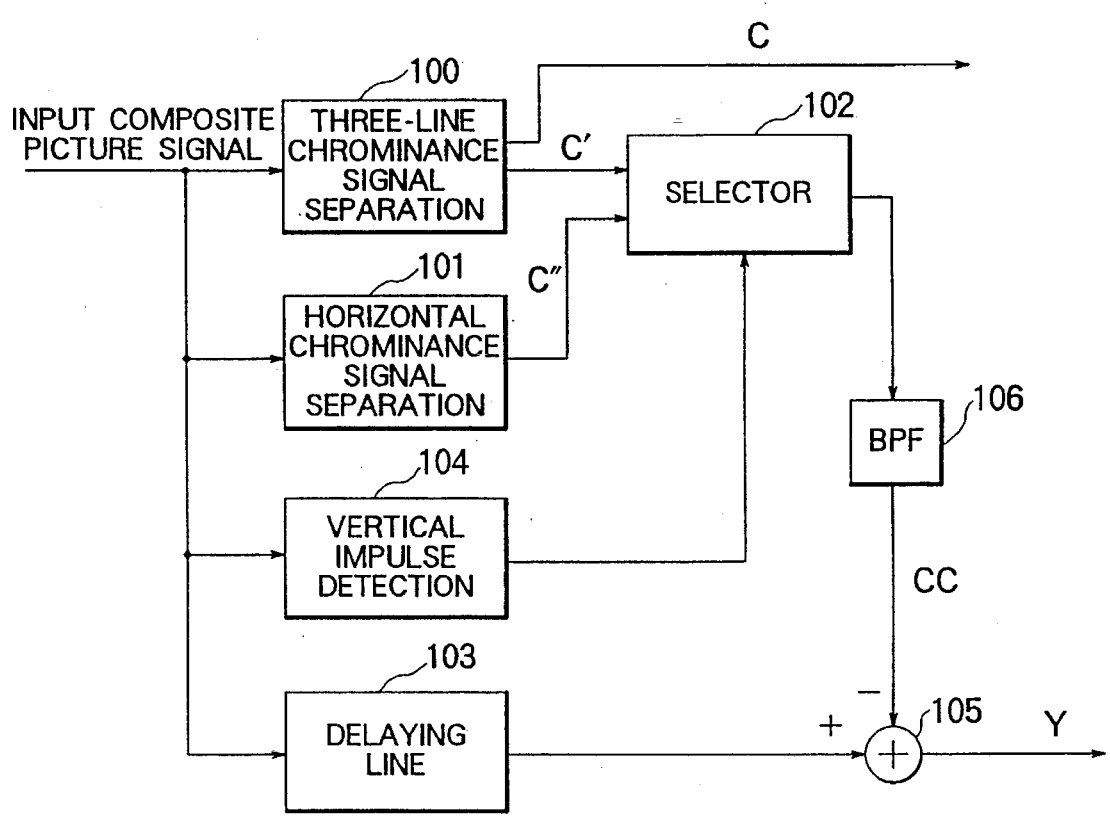
FIG. 2 is a block diagram showing a second embodiment of the present invention.

FIG. 2 shows another embodiment of the present invention. Since the operations of blocks of FIG. 2 with the same reference numerals as FIG. 1 are the same as those of FIG. 1, for simplicity, their description is omitted. An output signal of a selector 102 is supplied to a band-pass filter BPF 106. The band-pass filter 106 limits a horizontal band of an output signal of a selector 102. An output signal of the band-pass filter BPF 106 is a chrominance signal (CC) and supplied to a subtracter 105. This band-pass filter 106 is used to prevent a oblique characteristic component of a luminance signal of an input composite picture signal from being removed. Thus, since the oblique characteristic component of the luminance signal being separated remains, so-called "image blurring" can be prevented.

Figure 3A:
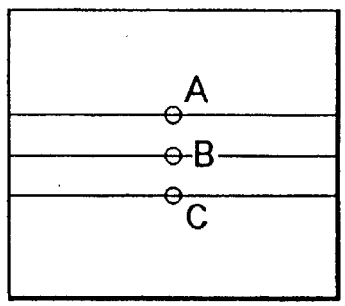
FIGS. 3A, 3B, and 3C are schematic diagrams for explaining vertical impulse patterns.
Figure 3B:
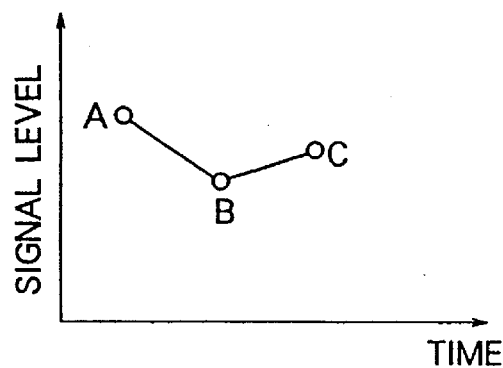
Figure 3C:
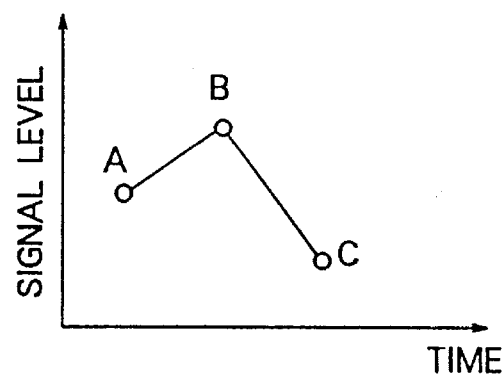

FIGS. 3A, 3B, and 3C are schematic diagrams for explaining a vertical impulse pattern. FIG. 3A is a schematic diagram showing a screen of a television receiver in the NTSC system. When circles A, B, and C on lines N−1, N, and N+1 of FIG. 3A are plotted as shown in FIGS. 3B and 3C, they are treated as vertical impulse patterns. In other words, the case where the level of the signal B on the present (N) horizontal line is smaller than each of the levels of the signals A and C of the horizontal lines N−2 and N+2 and the case where the level of the signal B on the present (N) horizontal line is larger than each of the levels of the signals A and C of the horizontal lines N−2 and N+2 are detected. Each of the signals A, B, and C is not an input composite picture signal itself. Rather, the signals A, B, and C are signals where a chrominance subcarrier band has been removed from the input composite picture signal by a low-pass filter LPF or the like. In other words, in the vertical pattern, the horizontal low band component of the input composite picture signal has a strong correlation with a chrominance signal that has been modulated with a subcarrier. A real example of the vertical impulse detecting circuit 104 will be described later.

In the PAL system, the lines N–2, N, and N+1 are substituted with N–2, N, and N+2, respectively.

Figure 4:
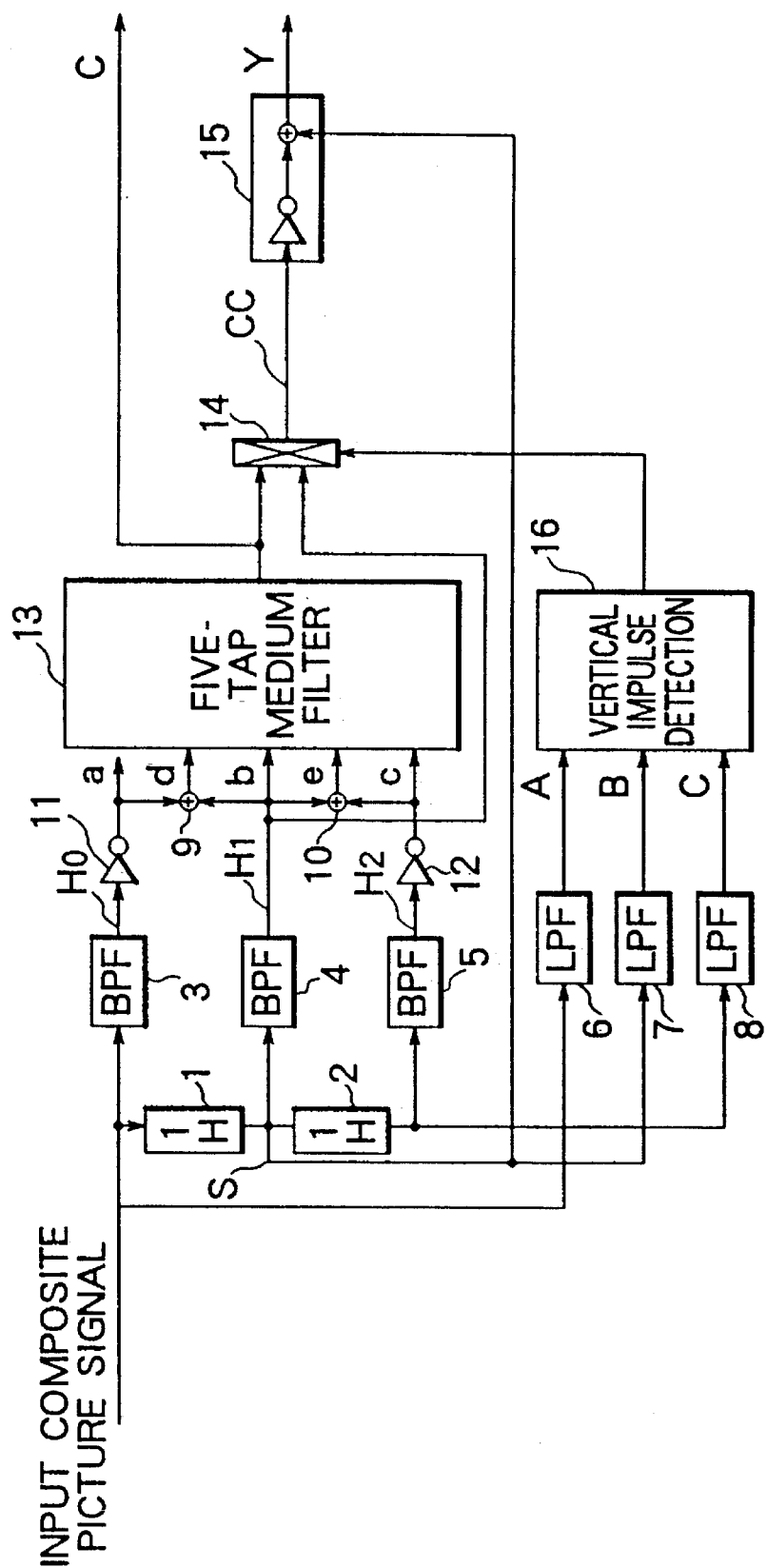
FIG. 4 is a circuit diagram showing a practical construction of the first embodiment of the present invention.

FIG. 4 shows a practical circuit construction in the NTSC system of an embodiment according to the present invention. In FIG. 4, an input composite picture signal is supplied to a band-pass filter BPF 3, a low-pass filter LPF 6, and a delaying circuit 1. The delaying circuit 1 delays the input composite picture signal by one horizontal line period and outputs a delay signal (S). The delay signal (S) is supplied to a band-pass filter BPF 4 and a low-pass filter LPF 7. The delay signal (S) is supplied to a delaying circuit 2. The delaying circuit 2 delays the delay signal (S) by one horizontal line period and outputs a delay signal. This delay signal is supplied to a band-pass filter BPF 5 and a low-pass filter LPF 8.

The band-pass filters BPF 3, 4, 5 extract chrominance signal components H0, H1, and H2 of these horizontal lines. The signal H1 (=b) is referred to as present data. To match the subcarrier phase of each of the signals H1 and H2 with the subcarrier phase of H0, the subcarrier phases of H1 and H2 are inverted by inverters 11 and 12. The inverted signals of the signals H0 and H2 are referred to as the signals a and c, respectively. Adders 9 and 10 extract signals d and e, where d=(a+b)/2 and e=(b+c)/2. These signals a, b, c, d, and e are supplied to a five-tap median filter 13. A signal with the third largest level is selected from these signals and output as a chrominance signal (C).

The low-pass filters LPF 6, 7, and 8 extract horizontal low band components A, B, and C (namely, a luminance signal) of the input composite picture signal. These signals A, B, and C are supplied to a vertical impulse detecting circuit 16. The operation of the vertical impulse detecting circuit 16 will be described later. An output signal of the vertical impulse detecting circuit 16 is supplied to a selector 14. The selector 14 selects either an output signal (C) of the five-input median filter 13 or an output signal (H1) of the band-pass filter 4 according to the output signal of the vertical impulse detecting circuit 16. An output signal (CC) of the selector 14 is supplied to a subtracter 15. The subtracter 15 subtracts the chrominance signal (CC) from the delay signal (S), which has been delayed for one horizontal line period by the delaying circuit 1, and outputs a luminance signal (Y).

Although the vertical impulse detecting circuit should satisfy the following conditions, the circuit construction thereof is not limited to that described above.

$$B-A>REF, B-C>REF \quad (1)$$

$$A-B>REF, C-B>REF \quad (2)$$

When the condition (1) or (2) is satisfied, the selector 13 is controlled so that the output signal (H1) of the band-pass filter BPF 4 becomes the chrominance signal (CC). On the other hand, when neither the condition (1) nor (2) is satisfied, the selector 14 is controlled so that the output signal (C) of the median filter 13 becomes the chrominance signal (CC). REF is a predetermined level. Normally, when the signal level is 100 IRE, REF accords with tens of percent.

Figure 5:
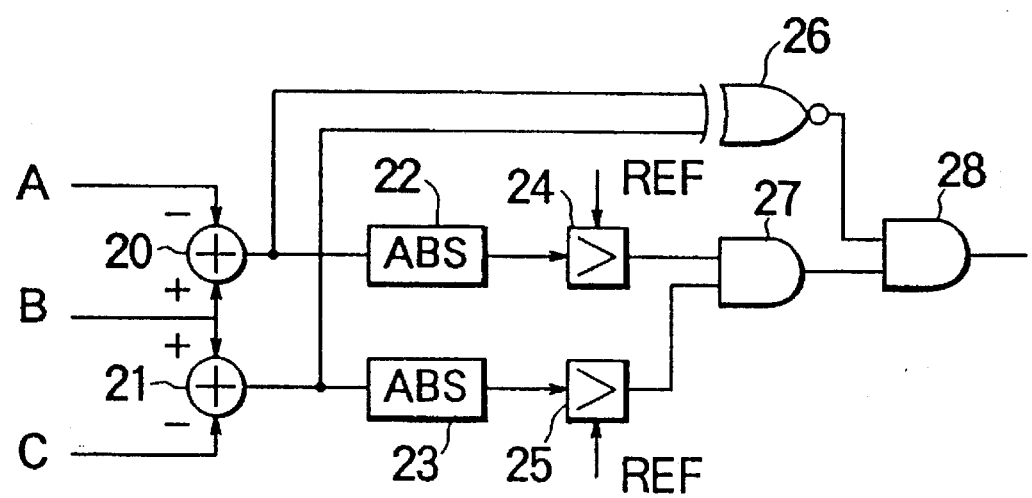
FIG. 5 is a circuit diagram showing a construction of a vertical impulse detecting circuit.

FIG. 5 shows a practical example of a circuit construction of the vertical impulse detecting circuit 16. Input signals A, B, and C of FIG. 5 accord with the signals A, B, and C of FIG. 4, respectively. These signals A, B, and C are low band components of an input composite picture signal. A subtracter 20 subtracts the signal A from the signal B. A subtracter 21 subtracts the signal C from the signal B. Absolute value calculating circuits 22 and 23 calculate the respective difference signals (B–A) and (B–C). Comparators 24 and 25 compare the respective absolute values with a predetermined comparison level value REF. An AND circuit 27 ANDs output signals of the comparators 24 and 25 so as to determine whether or not the above-mentioned conditions are satisfied. In addition, an inclusive-NOR circuit 26 extracts the case that the sign of the difference signal (B–A) matches with the sign of the difference signal (B–C). An AND gate 28 ANDs an output signal of the exclusive-NOR circuit 26 and an output signal of the AND circuit 27 and outputs a detection signal.

Figure 7:
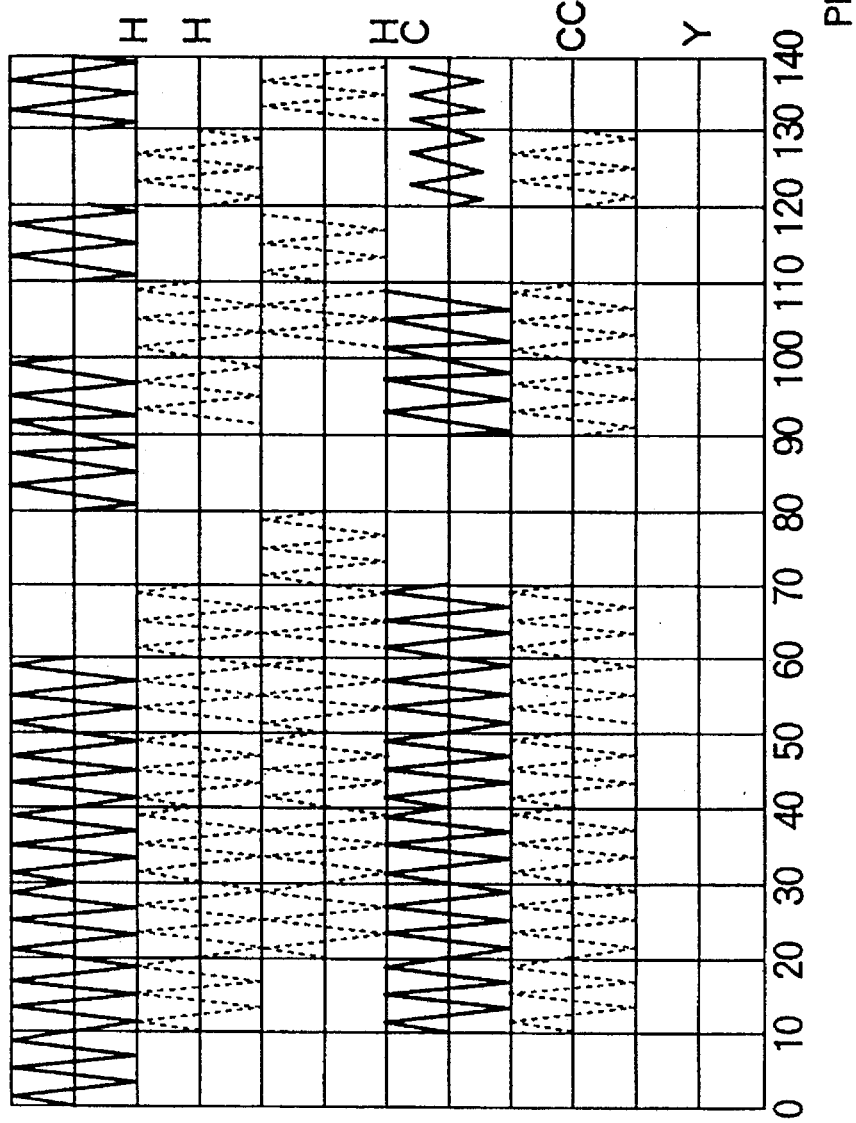
FIG. 7 is a graph showing a function of an embodiment of the present invention.
Figure 8:
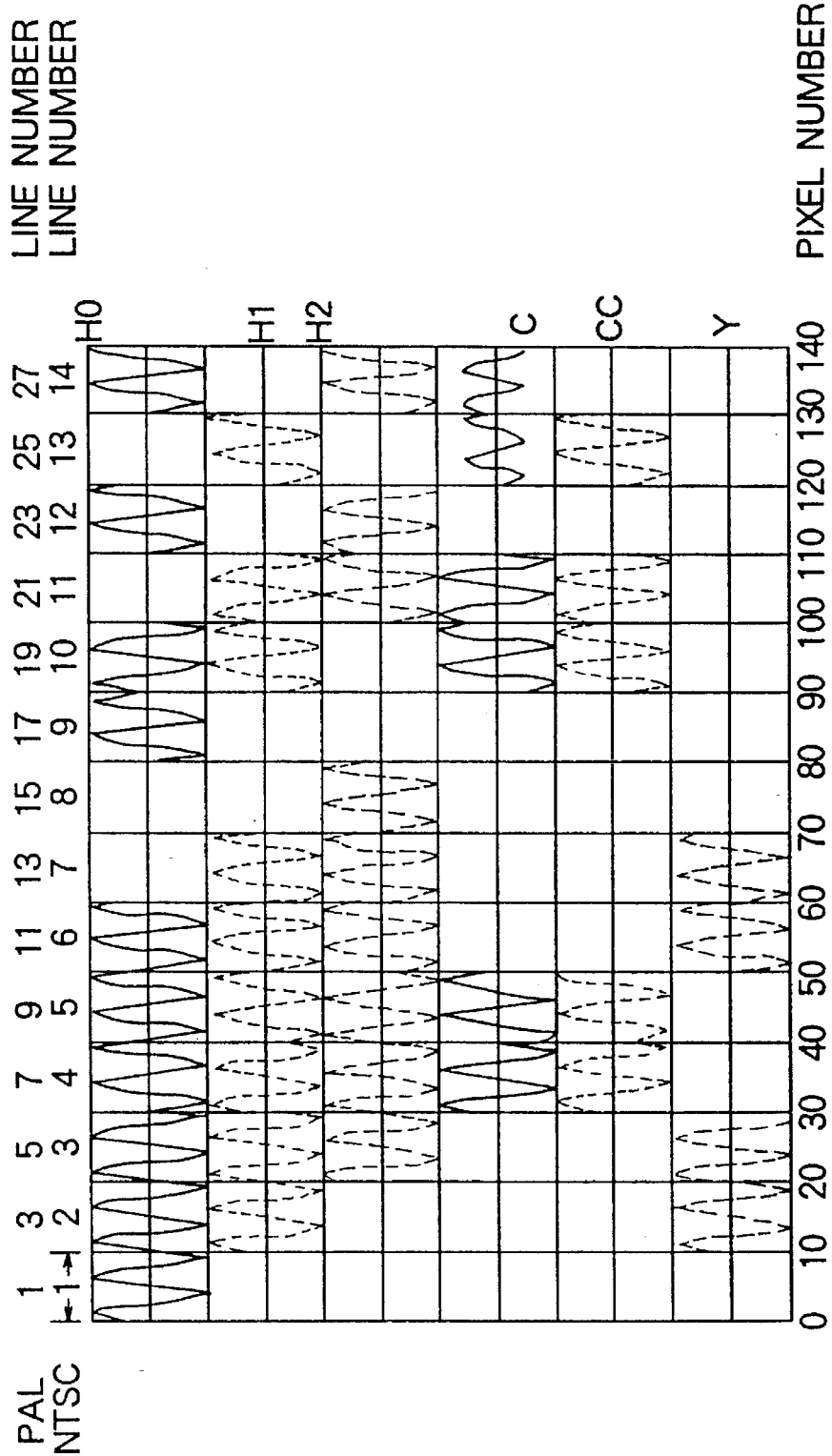
FIG. 8 is a graph showing the function of the embodiment of the present invention.
Figure 9:
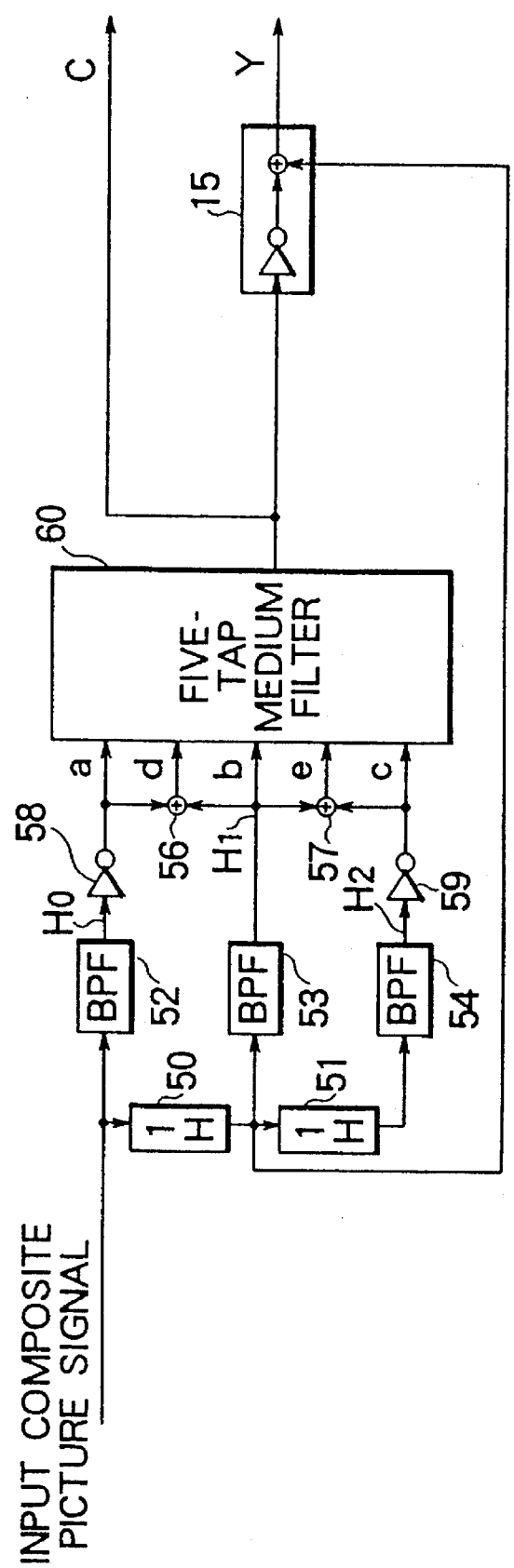
FIG. 9 is a circuit diagram showing a construction of a conventional Y/C separating circuit.
Figure 10A:
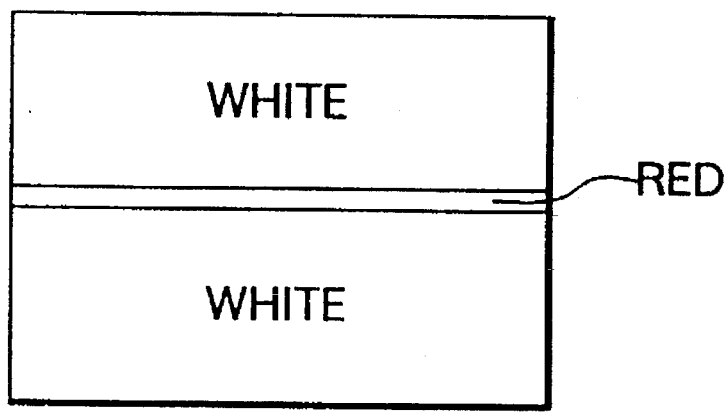
FIGS. 10A and 10B are schematic diagrams for explaining a dot interference.
Figure 10B:
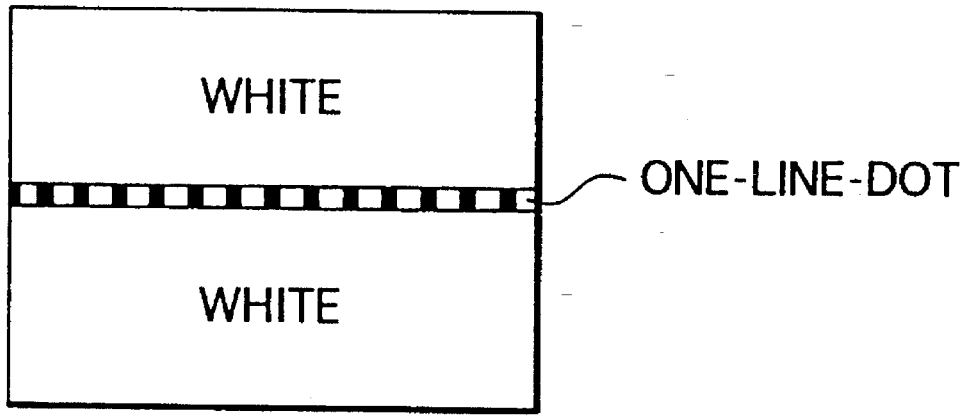
Figure 12:
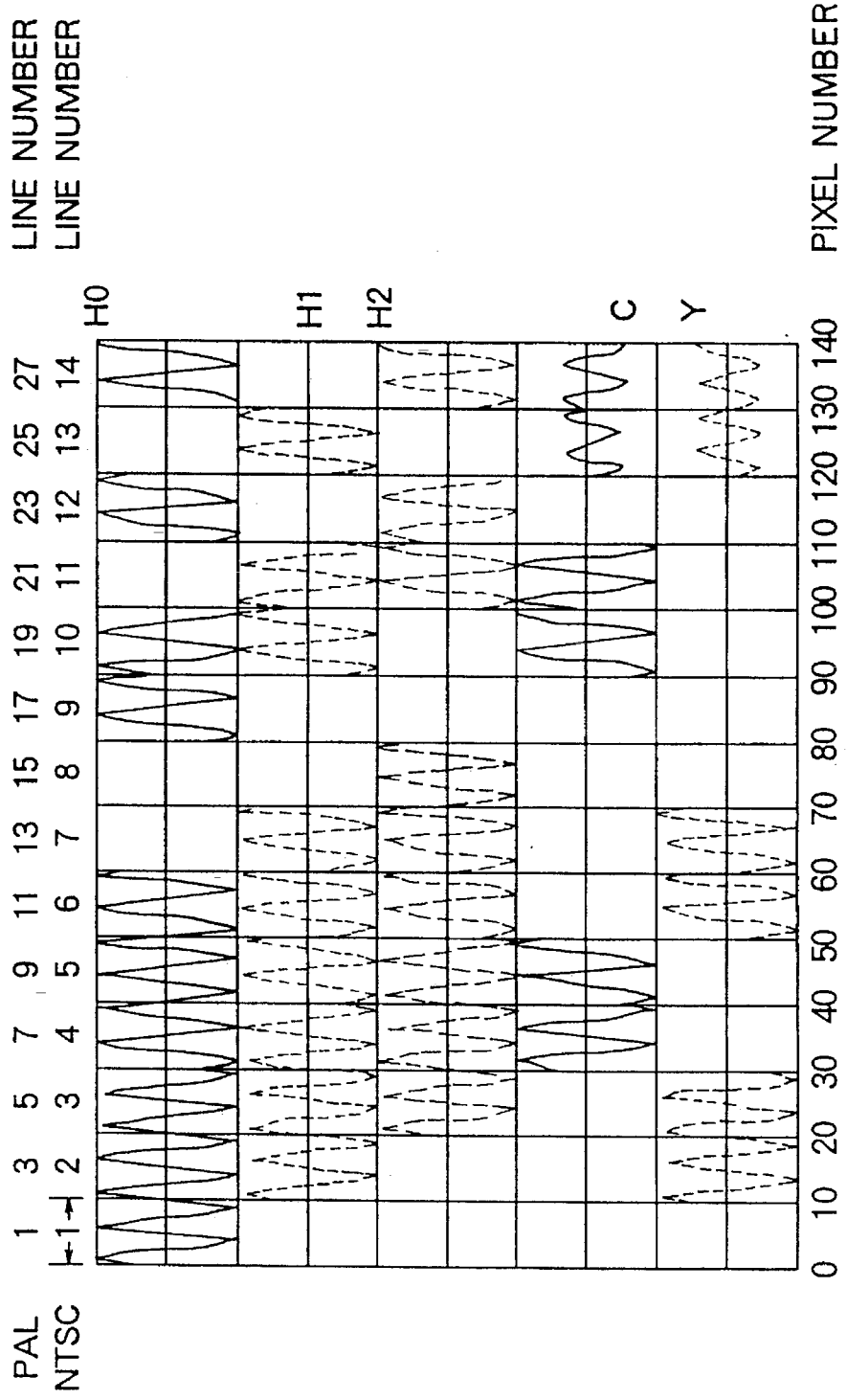
FIG. 12 is a graph showing the function of the conventional Y/C separating circuit.

As with FIGS. 11 and 12, FIGS. 7 and 8 schematically show a function of the circuit of the above-described embodiment. FIG. 7 is a chart showing a chrominance signal equivalent wave form. In this chart, a one-line-dot interference does not take place at a vertical impulse pattern portion (in lines 13 and 14). As is clear from the comparison between FIGS. 11 and 7, no one-line-dot interference takes place in an output signal Y as shown in FIG. 7. In addition, as is clear from the comparison between FIGS. 12 and 8, the wave form of the luminance signal (Y) of FIG. 8 does not change. Thus, when the input composite picture signal is composed of the luminance signal (Y) only, no abnormality takes place.

Figure 6:
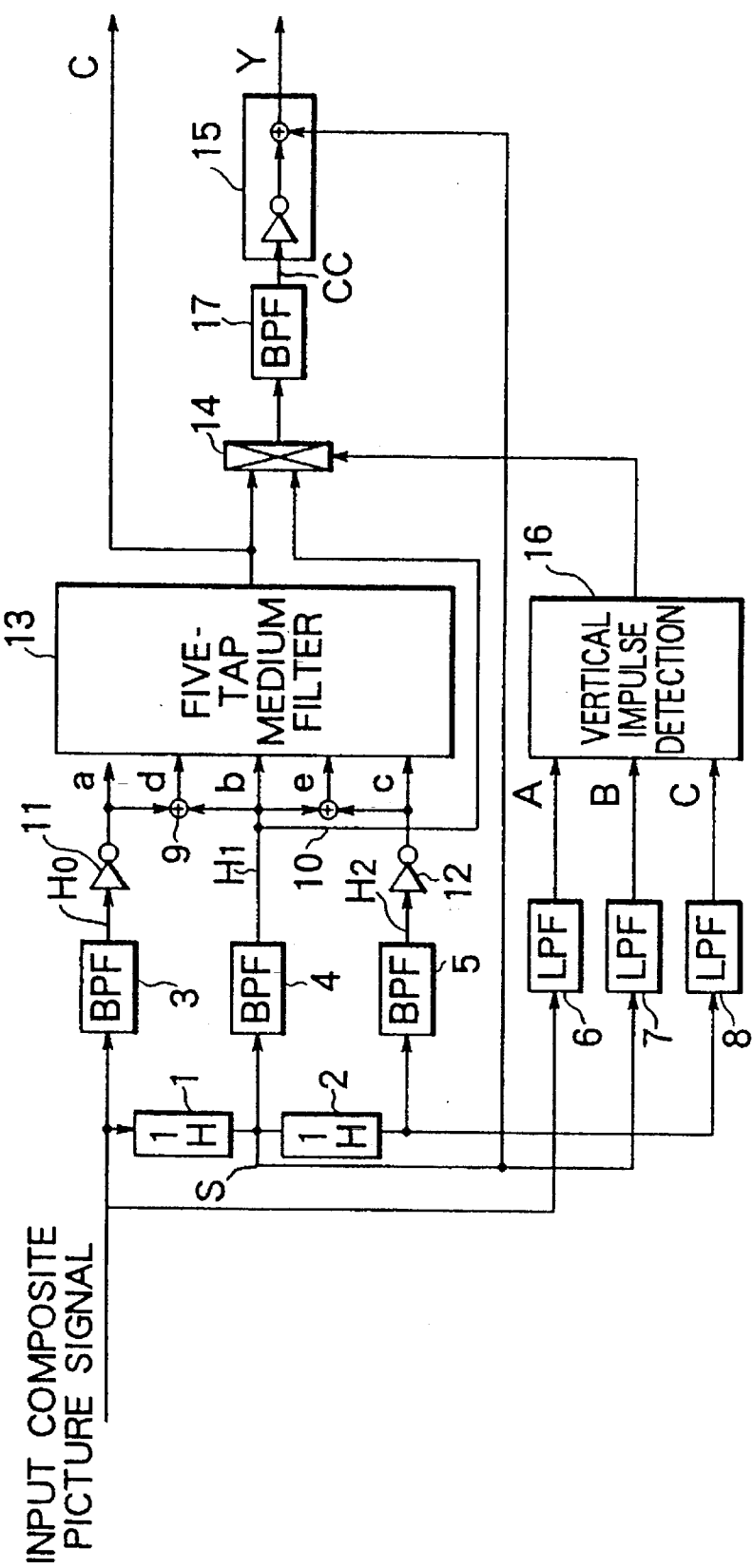
FIG. 6 is a circuit diagram showing a practical construction of the second embodiment of the present invention.

FIG. 6 shows a practical circuit construction of a second embodiment of the present invention. The difference between the constructions of the second and first embodiments respectively shown in FIGS. 6 and 4 is in that according to the second embodiment a band-pass filter 17 is disposed between a selector 14 and a subtracter 15. Since the band-pass filter 17 limits the band width of a subtraction chrominance signal (CC), an oblique characteristic component is not subtracted from a luminance signal contained in the input composite signal. Thus, as with the first embodiment, so-called image blurring does not take place and thereby image quality does not deteriorate.

In FIGS. 4 and 6, one input of the selector 14 may be connected to another band-pass filter disposed between the delaying circuit 1 and the selector 14, instead of the band-pass filter 4.

When the embodiments shown in FIGS. 4 and 5 are applied to the PAL system, the delay amount becomes 2H instead of 1H. Thus, the same effects as the NTSC system can be accomplished in the PAL system.

As described above, the Y/C separating circuit according to the present invention can prevent a dot interference from taking place in a vertical impulse pattern signal and separate a luminance signal and a chrominance signal from an input composite picture signal, thereby improving the picture quality both in the NTSC system and the PAL system.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A Y/C separating circuit for separating a luminance signal and a chrominance signal based on a low-frequency-band component of an input composite picture signal, comprising:

a three-line chrominance signal separating circuit for receiving said input composite picture signal and separating signal components for said chrominance signal from data of three horizontal lines of past, present, and future of said input composite picture signal;

a horizontal chrominance signal separating circuit for receiving said input composite picture signal and separating a function of said signal components as a candidate signal for said chrominance signal from said input composite image signal;

a vertical impulse detecting circuit for receiving said low-frequency-band component of said input composite picture signal and detecting whether a signal level of the data of said present horizontal line is larger or smaller than each of signal levels of the data of said past horizontal line and the data of said future horizontal line to produce a detected output signal, said present horizontal line being spaced apart from each of said past horizontal line and said future horizontal line by at least one horizontal line;

a selector for selecting as a selected chrominance signal either a particular one of said signal components of said three-line chrominance signal separating circuit or said candidate signal of said horizontal chrominance signal separating circuit dependent upon said detected output signal of said vertical impulse detecting circuit;

a delaying circuit for delaying said input composite picture signal by a predetermined time period to produce a delayed signal; and a subtracter for subtracting said selected chrominance signal of said selector from said delayed output signal of said delaying circuit to produce an output signal, wherein said output signal of said subtracter becomes said luminance signal.

2. The Y/C separating circuit as set forth in claim 1, wherein a band limiting filter is disposed between said selector and said subtracter.

3. A Y/C separating circuit for separating a luminance signal and a chrominance signal based on a low-frequency-band component of an input composite picture signal, comprising:

a three-line chrominance signal separating circuit for receiving said input composite picture signal and separating signal components for said chrominance signal from data of three horizontal lines of present, a plurality of lines ahead, and of three horizontal lines of past, a plurality of lines behind, of said input composite picture signal;

a horizontal chrominance signal separating circuit for receiving said input composite picture signal and separating a function of said signal components as a candidate signal for said chrominance signal from said input composite image signal;

a vertical impulse detecting circuit for receiving said low-frequency-band component of said input composite picture signal and detecting whether a signal level of the data of said present horizontal line is larger or smaller than each of signal levels of the data of said plurality-of-line-ahead horizontal line and the data of said plurality-of-line-behind present horizontal line being spaced apart from each of said plurality-of-line-ahead horizontal line and said plurality-of-line-behind horizontal line by at least one horizontal line;

a selector for selecting as a selected chrominance signal either a particular one of said signal components of said three-line chrominance signal separating circuit or said candidate signal of said horizontal chrominance signal separating circuit dependent upon said detected output signal of said vertical impulse detecting circuit;

a delaying circuit for delaying said input composite picture signal by a predetermined time period to produce a delayed signal; and a subtracter for subtracting said selected chrominance signal of said selector from said delayed signal of said delaying circuit to produce an output signal, wherein said output signal of said subtracter becomes said luminance signal.

4. The Y/C separating circuit as set forth in claim 3, wherein a band limiting filter is disposed between said selector and said subtracter.

* * * * *

UNITED STATES PATENT AND TRADEMARK OFFICE
CERTIFICATE OF CORRECTION

PATENT NO. : 5,548,342
DATED : August 20, 1996
INVENTOR(S) : Kazumasa IKEDA et al.

It is certified that error appears in the above-indentified patent and that said Letters Patent is hereby corrected as shown below:

Claim 3, Column 8, Line 22, after "plurality-of-line-behind", insert --horizontal line to produce a detected output signal, said--.

Signed and Sealed this

Eighteenth Day of February, 1997

Attest:

BRUCE LEHMAN

Attesting Officer

Commissioner of Patents and Trademarks